(12) United States Patent
Rusich

(10) Patent No.: US 9,644,905 B2
(45) Date of Patent: May 9, 2017

(54) VALVE WITH FLOW MODULATION DEVICE FOR HEAT EXCHANGER

(71) Applicant: Richard Rusich, Ellington, CT (US)

(72) Inventor: Richard Rusich, Ellington, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 531 days.

(21) Appl. No.: 13/628,883

(22) Filed: Sep. 27, 2012

(65) Prior Publication Data

US 2014/0083117 A1 Mar. 27, 2014

(51) Int. Cl.
| | |
|---|---|
| *F28F 27/02* | (2006.01) |
| *F16K 11/07* | (2006.01) |
| *F16K 11/085* | (2006.01) |
| *F25B 39/02* | (2006.01) |
| *F28D 21/00* | (2006.01) |

(52) U.S. Cl.
CPC ............ *F28F 27/02* (2013.01); *F16K 11/07* (2013.01); *F16K 11/0856* (2013.01); *F25B 39/028* (2013.01); *F28D 2021/0071* (2013.01)

(58) Field of Classification Search
CPC ..................................................... F28F 27/02
USPC ................... 165/96, 173, 174, 175; 251/310
See application file for complete search history.

(56) References Cited

U.S. PATENT DOCUMENTS

| | | | | |
|---|---|---|---|---|
| 2,261,596 | A | * 11/1941 | Stroobants ..................... 165/96 |
| 3,266,048 | A | * 8/1966 | Schweitzer ................ 346/140.1 |
| 3,698,204 | A | * 10/1972 | Schlotterbeck ........ B60H 1/321 62/206 |
| 3,794,063 | A | * 2/1974 | Carroll ...................... F16K 3/26 137/505.18 |
| 4,263,937 | A | * 4/1981 | Rudenko ............... F16K 11/076 137/553 |
| 4,397,335 | A | * 8/1983 | Doblar ............... A61B 5/02152 137/625.19 |
| 4,513,587 | A | * 4/1985 | Humpolik et al. ............. 62/515 |
| 4,553,566 | A | * 11/1985 | Barclay ................. F16K 11/085 137/625.11 |
| 5,059,226 | A | 10/1991 | Schneider et al. |
| 5,241,839 | A | * 9/1993 | Hughes ........................... 62/515 |
| 5,561,987 | A | 10/1996 | Hartfield et al. |
| 5,588,596 | A | 12/1996 | Hartfield et al. |

(Continued)

FOREIGN PATENT DOCUMENTS

| | | | |
|---|---|---|---|
| EP | 1518077 B1 | 11/2007 | |
| JP | 06129782 A | * 5/1994 | ............... F28D 7/06 |

(Continued)

OTHER PUBLICATIONS

Search Report issued in French Application No. 1357562; Jul. 31, 2013; 7 pages.

(Continued)

*Primary Examiner* — Devon Russell
(74) *Attorney, Agent, or Firm* — Cantor Colburn LLP

(57) ABSTRACT

An exdributor valve of a heat exchanger includes a distributor to distribute single phase liquid refrigerant to cooling channels of the heat exchanger and a flow modulation device. The flow modulation device is interposed between the distributor and the cooling channels and is modulates an area through which the single phase liquid refrigerant is permitted to flow.

15 Claims, 4 Drawing Sheets

(56) References Cited

U.S. PATENT DOCUMENTS

| | | | |
|---|---|---|---|
| 5,638,691 A | 6/1997 | Hartfield et al. | |
| 5,645,124 A | 7/1997 | Hartfield et al. | |
| 6,109,534 A * | 8/2000 | Ito et al. | 237/12.3 B |
| 6,293,112 B1 | 9/2001 | Moeykens et al. | |
| 7,231,962 B2 * | 6/2007 | Han | 165/96 |
| 7,461,687 B2 * | 12/2008 | Han et al. | 165/103 |
| 7,562,697 B2 | 7/2009 | Gorbounov et al. | |
| 7,828,044 B2 * | 11/2010 | Hagberg et al. | 165/96 |
| 7,892,847 B2 * | 2/2011 | Ito | 436/161 |
| 7,908,878 B2 | 3/2011 | Okamoto | |
| 7,931,073 B2 | 4/2011 | Gorbounov et al. | |
| 8,171,987 B2 | 5/2012 | Jiang et al. | |
| 8,235,101 B2 * | 8/2012 | Taras | F25B 13/00 165/101 |
| 8,616,238 B2 | 12/2013 | Lee | |
| 2006/0064997 A1 | 3/2006 | Grabon | |
| 2006/0179876 A1 * | 8/2006 | Yagisawa | F25B 39/02 62/515 |
| 2008/0017260 A1 * | 1/2008 | Oh | A61M 5/16881 137/625.3 |
| 2008/0177233 A1 * | 7/2008 | Lee | A61M 5/16804 604/151 |
| 2008/0251245 A1 | 10/2008 | Gorbounov et al. | |
| 2008/0289806 A1 * | 11/2008 | Gorbounov et al. | 165/173 |
| 2010/0095688 A1 | 4/2010 | Taras et al. | |
| 2010/0170664 A1 | 7/2010 | Vaisman et al. | |
| 2010/0236283 A1 | 9/2010 | Ballet et al. | |
| 2010/0282454 A1 * | 11/2010 | Jiang | F25B 39/028 165/175 |
| 2010/0287969 A1 | 11/2010 | Ueda et al. | |
| 2011/0000255 A1 * | 1/2011 | Taras et al. | 62/498 |
| 2011/0030934 A1 | 2/2011 | Munoz et al. | |
| 2011/0272049 A1 * | 11/2011 | Jorgensen | F16K 11/0856 137/625.47 |
| 2012/0012215 A1 * | 1/2012 | Lee | A61M 5/16877 137/861 |
| 2013/0213379 A1 * | 8/2013 | Schultz et al. | 126/110 C |

FOREIGN PATENT DOCUMENTS

| | | |
|---|---|---|
| WO | 2008060270 A1 | 5/2008 |
| WO | 2008073108 A1 | 6/2008 |
| WO | 2008140525 A1 | 11/2008 |
| WO | 2008147361 A1 | 12/2008 |
| WO | 2009139998 A2 | 11/2009 |
| WO | 2009152015 A2 | 12/2009 |

OTHER PUBLICATIONS

French Search Report for application No. 1357562 ; Mailing Date Jul. 24, 2014, 7 pages.

* cited by examiner

VALVE WITH FLOW MODULATION DEVICE FOR HEAT EXCHANGER

BACKGROUND OF THE INVENTION

The subject matter disclosed herein relates to an exdributor valve for a heat exchanger and to a heat exchanger including an exdributor valve.

In air conditioning and refrigeration systems, proper apportionment of two-phase flow to an evaporator heat exchanger has been a challenging issue for a long time. The difficulty occurs in maintaining the quality (gas-liquid mass fraction) and mass flow of the refrigerant equal for each fin passage inside the heat exchanger. With reference to the prior art device shown in FIG. 1, this is traditionally accomplished with an expansion valve 1. The expansion valve 1 is used to modulate refrigerant flow to the evaporator 2. The expansion valve 1 receives liquid refrigerant (single phase) and substantially reduces the pressure which results in "flashing" of the all-liquid refrigerant (single phase) to a liquid-gas state (two phase). The liquid and gas tend to separate downstream of the expansion point 3 due to inertial and gravitational forces. Tube-fin distributors 4 that are widely used in tube-fin evaporators are located immediately downstream of the expansion valve 1 and distribute the liquid-gas mixture before it can separate. A network of capillary tubes 5 is connected to each outlet port of the tube-fin distributor 4 to prevent cross-talk between each tube and individually routed to each fine passage. Tube-fin distributors are fairly good at maintaining uniform distribution to each fin passage of the evaporator 2.

Use of tube-fin distributors and individual capillary tubes with plate-fin, mini-channel, micro-channel, and brazed plate evaporators is seldom used due to its high labor and material cost associated with affixing each capillary tube to an individual fin passage. With these types of evaporators, piccolo distributors are commonly used and are located within the core of the heat exchanger. The cavity within the piccolo distributor cannot avert separation of the two-phase refrigerant resulting in a non-homogeneous liquid-gas mixture entering each distributor hole.

Many different types of two-phase distributors for plate-fin, mini-channel, micro-channel, brazed plate evaporators have been devised to attempt to equally apportion the amount of liquid and gas to each fin passage. However equal distribution has been historically unachievable, yielding a reduced level of heat transfer of the evaporator (the flow tends to stratify in the distributor and liquid pools at one end of the tube while vapor exists through the other ports). Even customized distributors that have been "tuned" to achieve relatively good distribution for one operating condition will inherently become ineffective for other operating conditions (lacks robustness/is not effective for all the operating condition).

To remedy this situation and obtain proper heat transfer, either a larger evaporator is needed (from an otherwise ideal smaller evaporator) or the temperature/pressure of the refrigerant inside the evaporator must be reduced (increasing the pressure ratio of the compressor) which requires more power usage.

BRIEF DESCRIPTION OF THE INVENTION

According to one aspect of the invention, an exdributor valve of a heat exchanger is provided and includes a distributor formed to define an interior and configured to distribute single phase liquid refrigerant from the interior to each cooling channel of the heat exchanger and a flow modulation device. The flow modulation device is operably interposed between the interior of the distributor and the cooling channels and is configured to modulate an area through which the single phase liquid refrigerant is permitted to flow from the interior of the distributor to each of the cooling channels.

According to another aspect of the invention, a heat exchanger is provided and includes an evaporator core including a plurality of cooling channels and an exdributor valve. The exdributor valve includes a distributor formed to define an interior and configured to substantially equally distribute single phase liquid refrigerant from the interior to the plurality of cooling channels and a flow modulation device. The flow modulation device is operably interposed between the interior of the distributor and the plurality of cooling channels and is configured to modulate an area through which the single phase liquid refrigerant is permitted to flow from the interior of the distributor to each of the plurality of cooling channels. The single phase refrigerant changes to a two-phase refrigerant when entering the plurality of cooling channels.

According to yet another aspect of the invention, a method of operating a heat exchanger including an evaporator core having a plurality of cooling channels is provided. The method includes distributing single phase liquid refrigerant from an interior of a distributor to the plurality of cooling channels and modulating an area through which the single phase liquid refrigerant is permitted to flow from the interior of the distributor to each of the plurality of cooling channels.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, an exdributor valve may eliminate the use of the traditional expansion valve and two-phase distributor by incorporating a single phase distributor, expansion and a flow modulation device. The exdributor receives liquid refrigerant (single phase) and distributes it equally to each distributor hole/slot. This can be achieved since the distribution takes place before the refrigerant flashes to a two-phase fluid. Distribution of single phase fluids (either all-gas or all-liquid) is much easier to achieve an equal apportionment than with two-phase fluids as there is no potential for non-homogeneous separation of the two-phase mixture. Simultaneously, the exdributor modulates the refrigerant flow by controlling the flow area of each distributor hole/slot. This is accomplished by substituting the conventional fixed distributor with a rotating or sliding distributor within a fixed distributor. Once properly apportioned to each distributor hole/slot, no hydraulic cross-talk can occur between the fluids flowing through each distributor hole. That is, the individual mass fraction of flow inside each distributor hole remains constant during the subsequent expansion and flashing of the fluid to a two-phase liquid-gas.

The rotating or sliding distributor is coupled to an actuator. When holes of the distributors are aligned, a flow area is maximized (full flow position). Modulation of flow is achieved by mis-aligning the holes of the distributors until the flow area is reduced to zero (full closed position) at which time the flow is shutoff. Since only liquid refrigerant enters each distributor hole, equal flow apportionment is relatively easy to achieve when properly sizing the distributor diameter and distribution hole diameters/slot widths.

Figure 1:
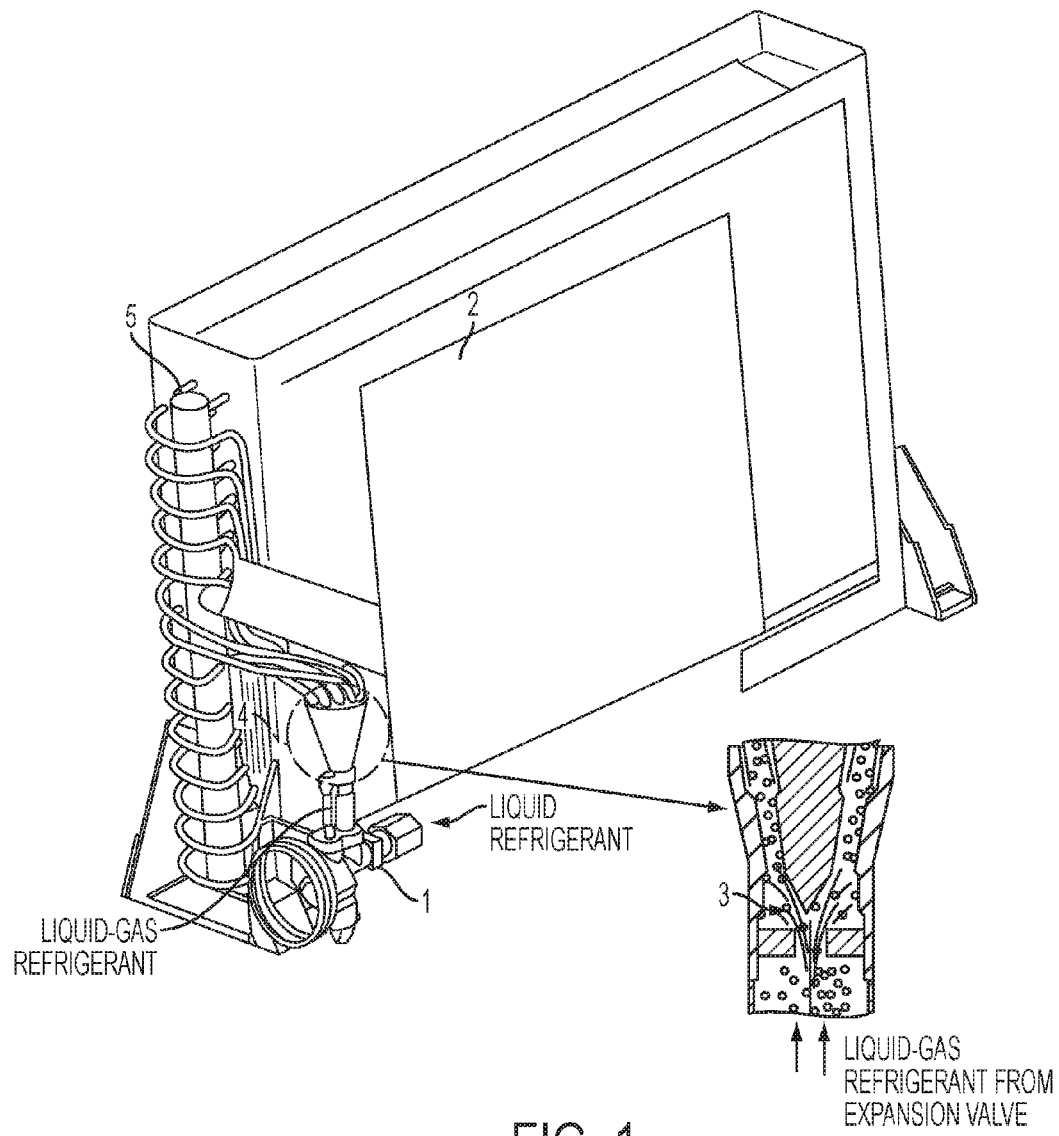
FIG. 1 is a perspective view of an evaporator device using an expansion valve in accordance with the prior art.
Figure 2:
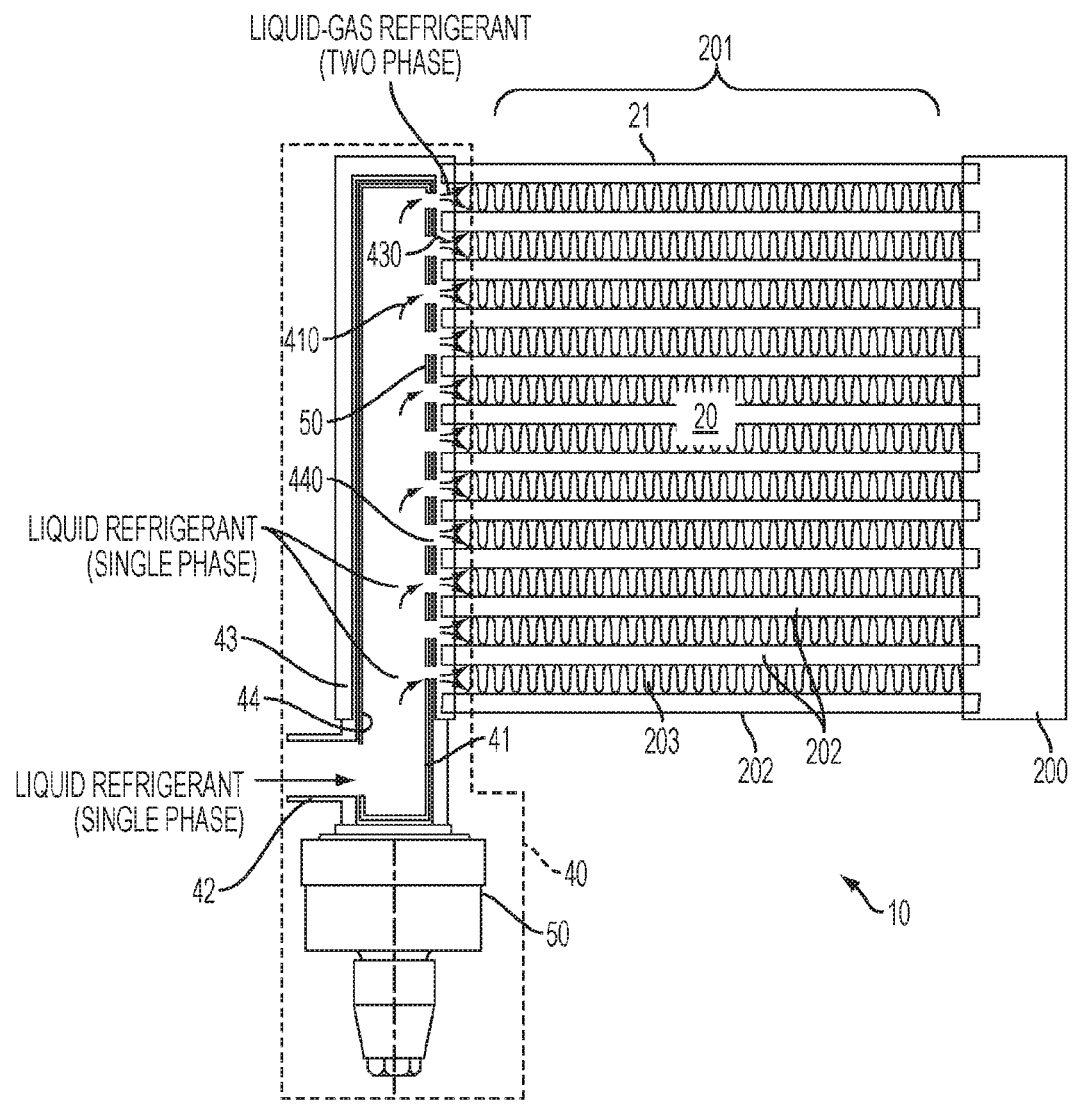
FIG. 2 is a schematic illustration of a heat exchanger including an exdributor valve in accordance with embodiments.

With reference to FIG. 2, a heat exchanger 10 is provided. The heat exchanger 10 includes an evaporator core 20 and an exdributor valve 40. The exdributor valve 40 includes a distributor manifold 41. The evaporator core 20 may include one or more of a plate-fin assembly 21, a mini-channel assembly, a micro-channel assembly and a brazed plate assembly. The evaporator core 20 may further include a header 200 disposed opposite from the distributor manifold 41, an interior 201 defined between the distributor manifold 41 and the header 200 through which a fluid is permitted to flow, a plurality of cooling channels 202 and fins 203. The cooling channels 202 extend from the distributor manifold 41 to the header 200. The fins 203 are disposed in contact with the cooling channels 202 and are thereby configured to promote heat transfer between fluid in the cooling channels 202 and the fluid permitted to flow through the interior 201, which is otherwise isolated from the fluid in the cooling channels 202.

The exdributor valve 40 includes the distributor manifold 41 and a flow modulation device 50. The distributor manifold 41 is formed to define an interior 410 and is configured to substantially equally distribute a single phase liquid refrigerant from the interior 410 to each of the cooling channels 202 such that the single phase liquid refrigerant may enter each of the cooling channels 202 while simultaneously flashing into a two phase liquid/gas refrigerant. The flow modulation device 50 is operably interposed between the interior 410 of the distributor manifold 41 and each of the cooling channels 202. The flow modulation device 50 is thereby configured to modulate an area through which the single phase liquid refrigerant is permitted to flow from the interior 410 of the distributor manifold 41 to each of the cooling channels 202.

As shown in FIG. 2, the distributor manifold 41 is formed to define a feed port 42 by which the single phase liquid refrigerant enters the interior 410. In addition, the distributor manifold 41 includes a fixed manifold body 43 and a movable manifold body 44. The fixed manifold body 43 may be substantially tubular in shape such that it extends longitudinally along an axis of the evaporator core 20 and may be formed to define first through-holes 430. The first through-holes 430 are respectively communicative with corresponding ones of the cooling channels 202. The first through-holes 430 may each have substantially similar dimensions or, in accordance with alternative embodiments, one or more of the first through-holes 430 may have unique dimensions. The movable manifold body 44 may be substantially similar in shape as the fixed manifold body 43 and may be sized for disposition inside or outside the fixed manifold body 43. The movable manifold body 44 may also be formed to define second through-holes 440, which are respectively communicative with corresponding ones of the cooling channels 202. The second through-holes 440 may each have substantially similar dimensions or, in accordance with alternative embodiments, one or more of the second through-holes 440 may have unique dimensions.

Although the fixed manifold body 43 and the movable manifold body 44 are described above as extending longitudinally along an axis of the evaporator core 20, it is to be understood that this is merely exemplary and that other orientations of the fixed manifold body 43 and the movable manifold body 44 are possible.

Also, it is to be understood that the cooling channels 202, the first through-holes 430 and the second through-holes 440 may be circular in some embodiments or an alternative shape in other embodiments. The alternative shape may be regular or irregular and need not be uniform across each of the cooling channels 202, each of the first through-holes 430 or each of the second through-holes 440. In some cases, the shape or sizes of the cooling channels 202, the first through-holes 430 and the second through-holes 440 may vary along the longitudinal dimension of the distributor manifold 41.

Figure 3:
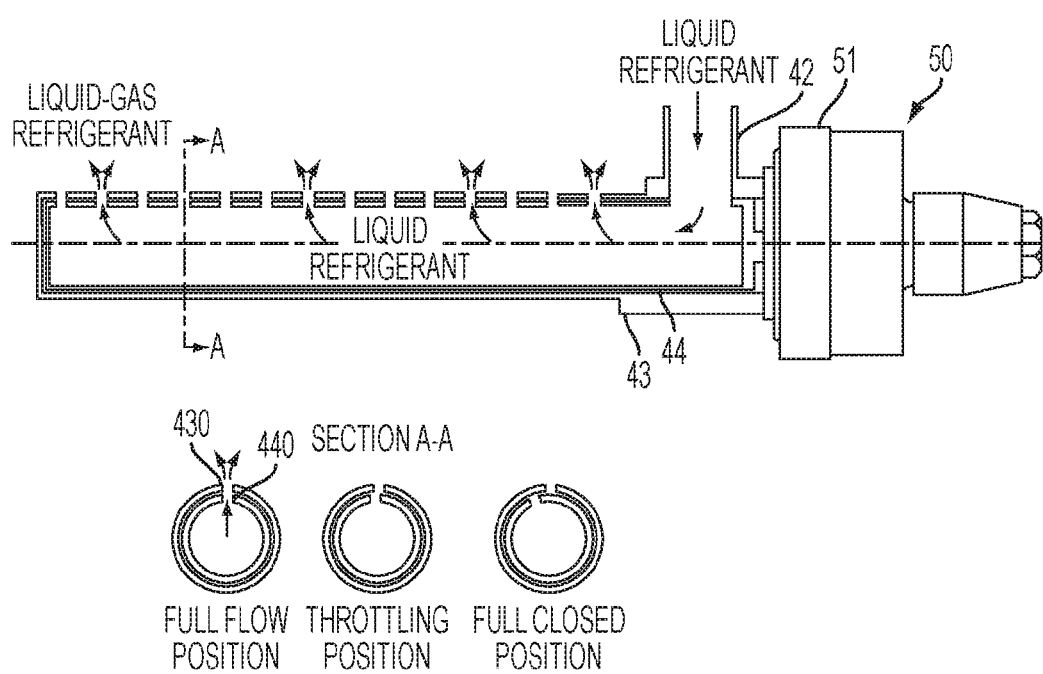
FIG. 3 is a diagram of an operation of an exdributor valve with a rotary actuator in accordance with embodiments.

At least one or both of the fixed manifold body 43 and the movable manifold body 44 may be coupled to the flow modulation device 50. As such, the flow modulation device 50 is configured to drive relative movement between the fixed manifold body 43 and the movable manifold body 44. With reference to FIG. 3, such movement may be provided as rotary movement or, with reference to FIG. 4, as linear movement. In either case, as a result of the relative movement between the fixed manifold body 43 and the movable manifold body 44 as driven by the flow modulation device 50, corresponding ones of the cooling channels 202, the first through-holes 430 and the second through-holes 440 may occupy and move between full flow positions, throttling positions and fully closed positions.

In the full flow positions, the corresponding ones of the cooling channels 202, the first through-holes 430 and the second through-holes 440 are disposed in substantial alignment. Thus, the single phase liquid refrigerant is able to flow through the entire area of the first and second through-holes 430 and 440 to the corresponding one of the cooling channels 202. In the throttling positions, the corresponding ones of the cooling channels 202, the first through-holes 430 and the second through-holes 440 are disposed in partial alignment. Thus, the single phase liquid refrigerant is able to flow through only a partial area of the first and second through-holes 430 and 440 to the corresponding one of the cooling channels 202. In the fully closed positions, the corresponding ones of the cooling channels 202, the first through-holes 430 and the second through-holes 440 are fully misaligned. Thus, the single phase liquid refrigerant is prevented from flowing through the first and second through-holes 430 and 440 to the corresponding one of the cooling channels 202.

In some embodiments, the respective shapes of one or more of the cooling channels 202, the first through-holes 430 and the second through-holes 440 may be contoured in order to maintain a linear relationship between refrigerant mass flow and the full flow, throttling and fully closed positions.

Figure 4:
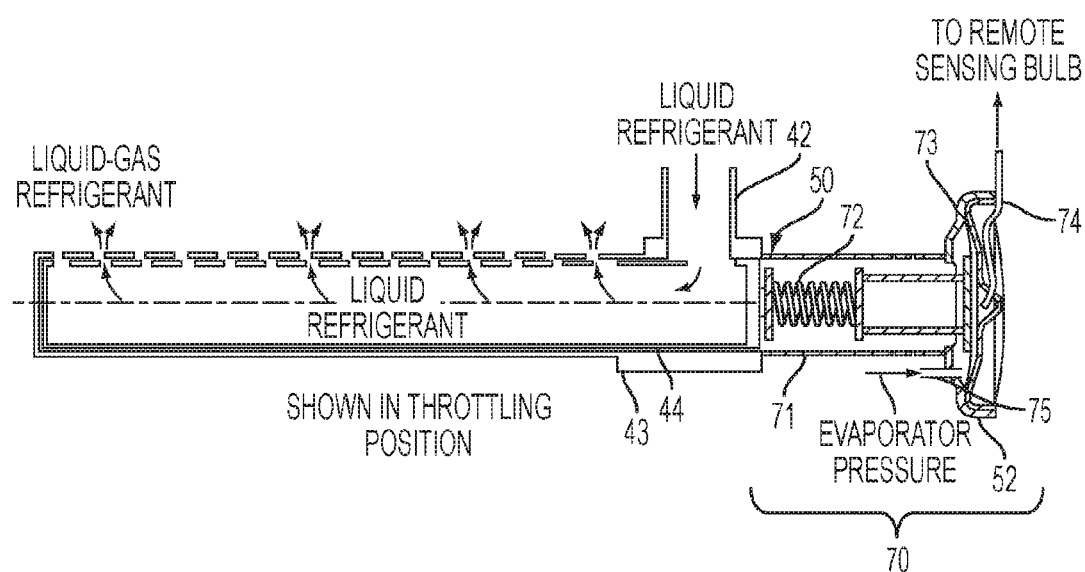
FIG. 4 is a diagram of an operation of an exdributor valve with a linear actuator in accordance with embodiments.

As shown in FIGS. 2-4, the cooling channels 202, the first through-holes 430 and the second through-holes 440 have similar dimensions and are similarly aligned. Moreover, the flow modulation device 50 drives the relative movement of the fixed manifold body 43 and the movable manifold body 44 such that each cooling channel/through-hole set moves between the full flow, throttling and fully closed positions substantially simultaneously. Thus, the flow modulation device 50 may be configured to substantially uniformly modulate the area through which the single phase liquid refrigerant is permitted to flow to each of the cooling channels 202.

However, in accordance with further embodiments, it is to be understood that the flow modulation device 50 may be configured to modulate the area the single phase refrigerant is permitted to flow to each of the cooling channels 202 uniquely. Such embodiments may provide for increased flexibility in controlling refrigerant flow into the evaporator core 20.

With reference to FIG. 3, embodiments in which the relative movement between the fixed manifold body 43 and the movable manifold body 44 is provided as rotary movement will now be described. As shown in FIG. 3, the flow modulation device 50 in these embodiments may include a rotary actuator 51, which is coupled to one or both of the fixed manifold body 43 and the movable manifold body 44. With such an arrangement, the rotary actuator 51 is configured to rotate the movable manifold body 44 relative to the fixed manifold body 43. In so doing, each cooling channel/through-hole set will proceed through the full flow, throttling and fully closed positions in a first moon phase sequence defined in the circumferential dimension of the distributor manifold 41.

With reference to FIG. 4, embodiments in which the relative movement between the fixed manifold body 43 and the movable manifold body 44 is provided as linear movement will now be described. As shown in FIG. 4, the flow modulation device 50 in these embodiments may include a linear actuator 52, which is coupled to one or both of the fixed manifold body 43 and the movable manifold body 44. With such an arrangement, the linear actuator 52 is configured to translate the movable manifold body 44 relative to the fixed manifold body 43. In so doing, each cooling channel/through-hole set will proceed through the full flow, throttling and fully closed positions in a second moon phase sequence defined along the longitudinal dimension of the distributor manifold 41.

In accordance with further embodiments, the rotary actuator 51 and the linear actuator 52 may be controlled manually, electrically or mechanically (see FIG. 4) via mechanical component 70. As shown in FIG. 4, the mechanical component 70 may include a housing 71 to house a network of springs 72 and diaphragms 73, which are coupled to one or both of the fixed manifold body 43 and the movable manifold body 44. The network of springs 72 and diaphragms 73 may be responsive to pressure signals from an expansion bulb via conduit 74 and an equalizer tube 75 connected to the evaporator core 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An exdributor valve of a heat exchanger, comprising:
a distributor defining an interior extending along a longitudinal axis and receptive of single phase liquid refrigerant (SPLR) flowing in a first direction transversely oriented relative to the longitudinal axis and configured to distribute the SPLR from the interior to cooling channels of the heat exchanger in a second direction parallel with the first direction; and
a flow modulation device,
the distributor comprising:
fixed and movable bodies respectively defining first and second through-holes respectively communicative with corresponding ones of the cooling channels, the corresponding first and second through-holes forming through-hole pairs at a single side of the interior; and
a feed port disposed at an axial location defined along but radially offset in a first direction from the longitudinal axis, which is entirely axially interposed between respective axial locations of the flow modulation device and a proximal outermost one of the through-hole pairs, which are defined along but radially offset in a second direction from the longitudinal axis,
the flow modulation device being configured to move the movable body relative to the fixed body to modulate an area through which the SPLR is permitted to flow from the interior to each of the cooling channels.

2. The exdributor valve according to claim 1, wherein the first and second through-holes have substantially similar dimensions.

3. The exdributor valve according to claim 1, wherein the flow modulation device comprises a rotary actuator configured to rotate the movable body relative to the fixed body.

4. The exdributor valve according to claim 1, wherein the flow modulation device comprises a linear actuator configured to translate the movable body relative to the fixed body.

5. The exdributor valve according to claim 1, wherein the flow modulation device comprises an electrical actuator.

6. The exdributor valve according to claim 1, wherein the flow modulation device comprises a mechanical actuator.

7. A heat exchanger, comprising:
an evaporator core including cooling channels; and
an exdributor valve comprising:
a distributor extending along a longitudinal axis, receptive of single phase liquid refrigerant (SPLR) flowing in a first direction transversely oriented relative to the longitudinal axis and configured to distribute the SPLR from the interior to the cooling channels in a second direction parallel with the first direction; and
a flow modulation device,
the distributor comprising:
fixed and movable bodies respectively defining first and second through-holes respectively communicative with corresponding ones of the cooling channels, the corresponding first and second through-holes forming through-hole pairs at a single side of the distributor; and
a feed port disposed at an axial location defined along but radially offset in a first direction from the longitudinal axis, which is entirely axially interposed between respective axial locations of the flow modulation device and a proximal outermost one of the through-hole pairs, which are defined along but radially offset in a second direction from the longitudinal axis,
the flow modulation device being configured to move the movable body relative to the fixed body to modulate an area through which the SPLR is permitted to flow from the distributor to the cooling channels.

8. The heat exchanger according to claim 7, wherein the evaporator core comprises a plate-fin assembly.

9. The heat exchanger according to claim 7, wherein the first and second through-holes have substantially similar dimensions.

10. The heat exchanger according to claim 7, wherein the flow modulation device substantially uniformly modulates the area through which the SPLR is permitted to flow to the cooling channels.

11. The heat exchanger according to claim 7, wherein the flow modulation device comprises a rotary actuator configured to rotate the movable body relative to the fixed body.

12. The heat exchanger according to claim 7, wherein the flow modulation device comprises a linear actuator configured to translate the movable body relative to the fixed body.

13. The heat exchanger according to claim 7, wherein the flow modulation device comprises an electrical actuator.

14. The heat exchanger according to claim 7, wherein the flow modulation device comprises a mechanical actuator.

15. A method of operating a heat exchanger including an evaporator core having cooling channels, the method comprising:

disposing a fixed body defining first through-holes within a distributor such that the first through-holes respectively communicate with corresponding ones of the cooling channels;
disposing a movable body defining second through-holes within the distributor such that the second through-holes respectively form through-hole pairs with the first through-holes and communicate with corresponding ones of the cooling channels;
coupling a flow modulation device to the movable body;
receiving, in an interior of the distributor, single phase liquid refrigerant (SPLR) flowing in a first direction transversely oriented relative to a longitudinal axis of the distributor via a feed port,
the feed port being disposed at an axial location defined along but radially offset in a first direction from the longitudinal axis, which is entirely axially interposed between respective axial locations of the flow modulation device and a proximal outermost one of the through-hole pairs, which are defined along but radially offset in a second direction from the longitudinal axis;
distributing the SPLR from the interior, through the through-hole pairs and to the cooling channels in a second direction parallel with the first direction; and
actuating the flow modulation device to modulate respective areas of the through-holes pairs.

* * * * *